US007367017B2

(12) United States Patent
Maddocks et al.

(10) Patent No.: US 7,367,017 B2
(45) Date of Patent: Apr. 29, 2008

(54) METHOD AND APPARATUS FOR ANALYZING MACHINE CONTROL SEQUENCES

(75) Inventors: Peter M. Maddocks, Fort Collins, CO (US); David P. Ferguson, Berthoud, CO (US); Steve Maddocks, Windsor, CO (US); William G. Weitzel, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 680 days.

(21) Appl. No.: 09/773,118

(22) Filed: Jan. 31, 2001

(65) Prior Publication Data

US 2004/0201627 A1 Oct. 14, 2004

(51) Int. Cl.
G06F 9/44 (2006.01)
G06F 3/00 (2006.01)

(52) U.S. Cl. .............. 717/115; 717/105; 717/106; 717/109; 717/113; 715/762; 715/763; 715/700

(58) Field of Classification Search ............... 717/124, 717/126, 127, 105–119, 136, 137; 714/46, 714/38, 33; 705/1; 345/804; 715/853, 762, 715/763, 700, 967
See application file for complete search history.

(56) References Cited

U.S. PATENT DOCUMENTS

| 5,546,519 | A | | 8/1996 | Berry |
| 5,590,330 | A | * | 12/1996 | Coskun et al. ............... 717/126 |
| 5,781,720 | A | * | 7/1998 | Parker et al. ................. 714/38 |
| 5,953,726 | A | | 9/1999 | Carter et al. |
| 6,002,868 | A | * | 12/1999 | Jenkins et al. ............... 717/105 |
| 6,026,362 | A | * | 2/2000 | Kim et al. ...................... 705/1 |
| 6,208,640 | B1 | | 3/2001 | Spell et al. |
| 6,279,124 | B1 | * | 8/2001 | Brouwer et al. ............... 714/38 |
| 6,298,474 | B1 | * | 10/2001 | Blowers et al. ............. 717/104 |
| 6,311,320 | B1 | * | 10/2001 | Jibbe ........................... 717/111 |
| 6,463,552 | B1 | * | 10/2002 | Jibbe ............................ 714/33 |
| 6,466,240 | B1 | | 10/2002 | Maslov |
| 6,587,969 | B1 | * | 7/2003 | Weinberg et al. ............. 714/46 |
| 6,651,241 | B1 | * | 11/2003 | Hernandez, III ............ 717/112 |
| 6,658,646 | B1 | * | 12/2003 | Hernandez, III ............ 717/115 |
| 6,701,514 | B1 | * | 3/2004 | Haswell et al. ............... 717/115 |
| 6,724,409 | B1 | * | 4/2004 | Maddocks et al. .......... 715/853 |
| 2002/0085041 | A1 | * | 7/2002 | Ishikawa ..................... 345/804 |
| 2002/0087949 | A1 | * | 7/2002 | Golender et al. ........... 717/124 |
| 2002/0091968 | A1 | * | 7/2002 | Moreaux et al. .............. 714/38 |
| 2002/0120919 | A1 | * | 8/2002 | Aizenbud-Reshef et al. ..... 717/127 |

OTHER PUBLICATIONS

Hall, Swing Tutorial: JTree, 1999.*

* cited by examiner

Primary Examiner—Meng-Al T. An
Assistant Examiner—Insun Kang

(57) ABSTRACT

A graphical user interface (GUI) is provided that enables machine control sequences and the results of their execution to be easily and expediently analyzed. Logic is configured to execute GUI generation code and GUI user interaction handling code, and control a display device. When the logic executes the GUI generation code, a first window is displayed on the display device. The first window presents at least one option that enables a user to open a file comprising machine control sequence execution results resulting from execution of a machine control sequence. When the file is opened, a second window is displayed on the display device. The second window displays at least a summary of the execution results comprised in the file.

31 Claims, 6 Drawing Sheets

FIG. 6

METHOD AND APPARATUS FOR ANALYZING MACHINE CONTROL SEQUENCES

TECHNICAL FIELD OF THE INVENTION

The present invention relates to a method and apparatus for analyzing machine control sequences and more particularly, to a graphical user interface (GUI) system for analyzing machine control sequences sent to various types of devices and the results of execution of the machine control sequences by the devices.

BACKGROUND OF THE INVENTION

In backup storage systems, such as those used for large servers, robotics are often employed to move tapes to and from drives in order to store backup data from the servers on the tapes. These backup storage systems are tested by issuing various machine control sequences that cause the robotics and drives to perform various operations and by measuring the execution results. Currently, text-based scripts are used to create the machine control sequences that are used to perform these operations. In order to modify the machine control sequences, the text-based scripts must be modified. Both creating and modifying text-based scripts can be extremely difficult and time-consuming tasks due to the cryptic nature of text-based scripts.

The results of execution of the text-based scripts by devices are typically presented in the form of text-based log files, which are equally cryptic and difficult to understand, even to persons skilled in analyzing such files. Although GUI analysis tools, such as UNIX and Motif running on Windows, are capable of being set up to make analyzing machine control sequence results easier than the task of analyzing text-based log files, these tools still do not provide a convenient way for viewing high-level execution summary data or low-level device debugging data. Furthermore, these types of tools are implemented in their native languages and are not portable over different operating systems.

SUMMARY OF THE INVENTION

Accordingly, a need exists for a convenient and expedient way to view and analyze machine control sequences and the corresponding execution results. The present invention provides a graphical user interface (GUI) that enables machine control sequences and the results of execution of the machine control sequences to be displayed in a form that is easy to understand and analyze.

The apparatus of the present invention comprises logic configured to execute GUI generation code and GUI user interaction handling code, and a display device. When the logic executes the GUI generation code, a first window is displayed on the display device. The first window presents at least one option that enables a user to open a file comprising machine control sequence execution results resulting from execution of a machine control sequence. When the file is opened, a second window is displayed on the display device. The second window displays at least a summary of said execution results comprised in the file.

The method of the present invention comprises the steps of displaying a GUI having a first window and, upon detecting that a user has selected a particular option displayed in the first window, displaying a second window. The option displayed in the first window enables a user to open a file comprising machine control sequence execution results resulting from execution of a machine control sequence. Upon detecting a selection of the option by the user, the second window is displayed, which presents at least a summary of execution results comprised in the file.

Other features and advantages of the present invention will become apparent from the following discussion, drawings and claims.

BRIEF DESCRIPTION OF THE DRAWINGS

FIG. 6 is an exemplary window of the GUI according to the present invention enabling the user view and analyze machine control sequences and the results of executing the machine control sequences.

DETAILED DESCRIPTION OF THE INVENTION

Prior to describing the preferred embodiment of the GUI of the present invention, a discussion will be provided with respect to creating and editing machine control sequences, since this typically occurs before the machine control sequences can be executed. However, those skilled in the art will understand, in view of the discussion provided herein, that the present invention is not limited with respect to the manner in which machine control sequences are created and/or edited.

Figure 1:
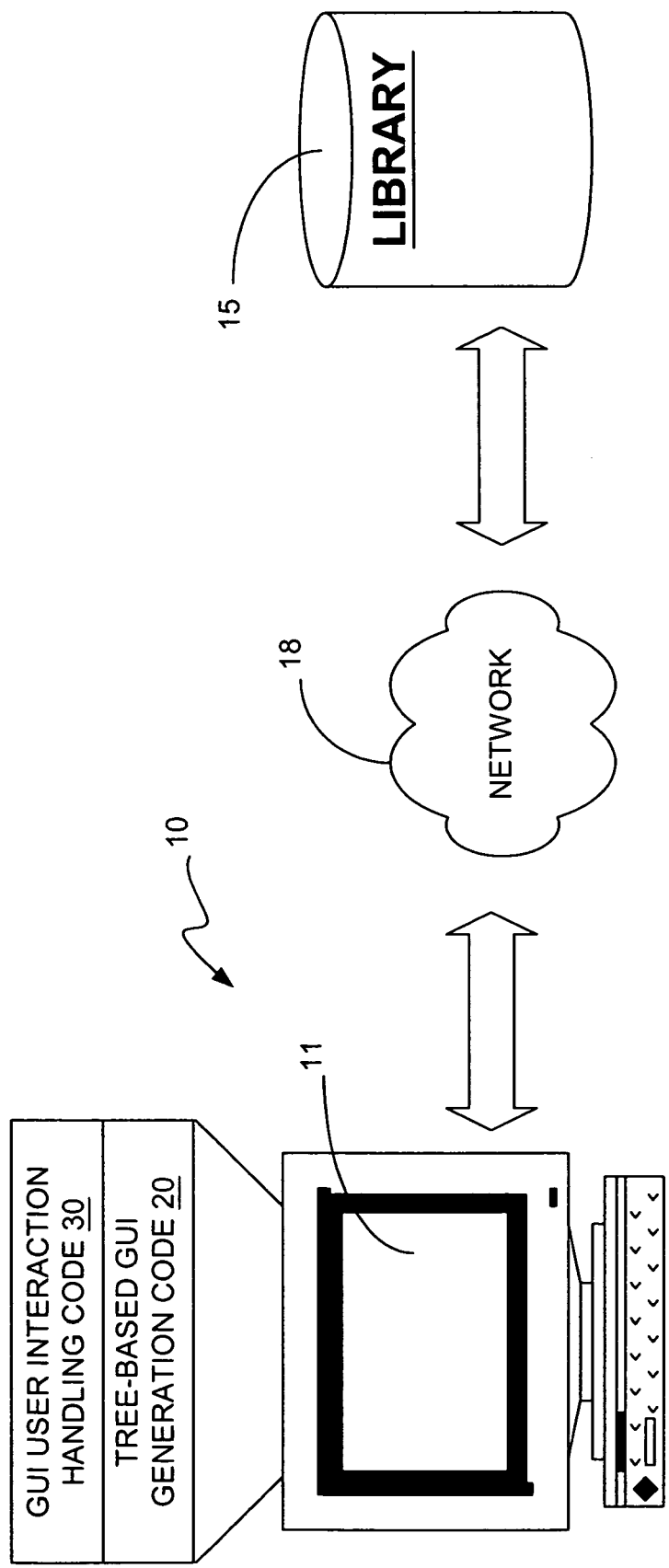
FIG. 1 is a diagram illustrating a computer capable of being configured in accordance with the present invention to generate and display the GUI of the present invention and to execute the associated GUI user interaction handling code.

The present invention preferably utilizes a tree-based GUI that enables test programs for testing various devices to be set up at a very high level. The GUI also enables parameters used in the programs to be easily changed at a very high level, thereby enabling the test programs to be easily modified. FIG. 1 is a block diagram illustrating a computer 10, which corresponds to the apparatus of the present invention and which performs the methods of the present invention, namely, generating the various windows of the GUI and executing the associated GUI user interaction handling code. As shown in FIG. 1, the computer 10 executes GUI generation code 20 and the associated GUI user interaction handling code 30.

When the computer 10 begins executing the GUI generation code 20, preferably a tree-based GUI sequence editor (FIGS. 2 and 3) is displayed on the display monitor 11 of the computer 10. When the GUI generation code 20 is executed, the GUI user interaction handling code 30 is also executed. In response to selections made by the user in the windows of the GUI, the GUI user interaction handling code 30 performs operations, such as, for example, displaying a particular window of the GUI on the display monitor 11, configuring a device, adding/altering a command of a particular sequence, or executing one or more machine control sequences.

All of the information needed to enable tests to be set up and executed may be stored in a memory device (not shown) comprised by computer 10. Alternatively, some or all of the needed information could be stored in a memory device 15 that functions as a library or repository for command sequences and tests that have previously been created and/or performed, and environment variables used in the tests. In the latter case, the computer 10 would communicate with the memory device 15 via a network 18, which could be, for example, a local area network LAN), a wide area network (WAN), the Internet, etc. This type of configuration would enable multiple users to create, edit and/or execute machine control sequences at their workstations by accessing previously created machine control sequences and/or the corresponding results over the network 18. Additionally, the newly created machine control sequences and/or the corresponding execution results could be stored in the repository memory device 15 so that the new sequences would be available to other authorized users.

Preferably, the GUI generation code 20 and the GUI user interaction handling code 30 are written in the JAVA™ programming language to enable the present invention to be platform-independent and therefore portable over different computers, handheld devices and appliances, regardless of the operating system that is running on them. Given the discussion and drawings provided herein, those skilled in the art will understand the manner in which the GUI of the present invention could be implemented in the JAVA™ programming language or some other language. The language used, whether it is the JAVA™ programming language or some other language, preferably is an object-oriented language.

Figure 2:
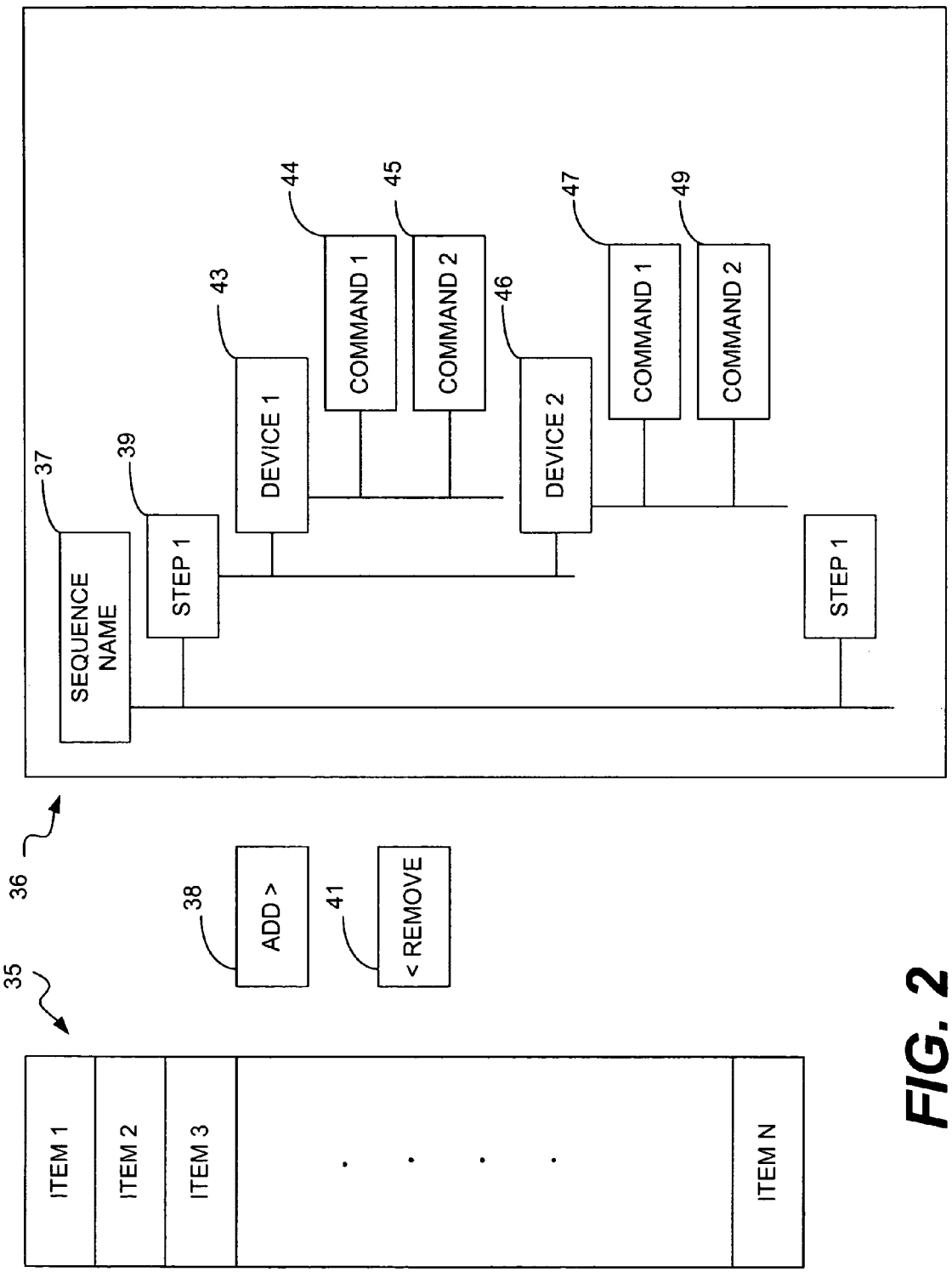
FIG. 2 is a diagram illustrating the preferred GUI design of the present invention for creating or editing machine control sequences.

FIG. 2 is a diagram of the sequence editor of the GUI in accordance with the preferred embodiment, which is the initial screen displayed to the user. The block 35 is the "JAVA™ List Control" (hereinafter referred to as "Jlist"), which comprises a list of items 1 through N. The items may be "Steps", "Devices", or "Commands", depending on which node in the JAVA™ tree control 36 (hereinafter referred to as "Jtree") is selected, as will now be described. The Jtree 36 is a hierarchical tree structure of sequences, steps, devices and commands, with the sequence being at the root of the tree structure. Each of the blocks in the Jtree 36 can be viewed as nodes in the tree structure. The "Sequence Name" 37 corresponds to the sequence to be used or edited. Each sequence comprises at least one step, each of which has at least one device belonging to it. Each device has at least one command belonging to it.

If the "Sequence Name" 37 is selected by the user by, for example, placing the cursor on that node and clicking the left mouse button, the Jlist 35 will display a list of steps. A step can be added to the tree structure by highlighting the desired step in the Jlist 35 and then selecting the "ADD" button 38. In order to remove a step from the Jtree 36, the step, such as "Step 1" 39, is highlighted and then the "REMOVE" button 41 is selected. This action will cause the selected step and any devices branching off of the step and their associated commands to be removed from the Jtree 36. Therefore, if Step 1 is highlighted and the "REMOVE" button 41 is selected, Device 1 and Commands 1 and 2, which are labeled with numerals 43, 44 and 45 will be removed from the Jtree 36.

If a step node is selected, the Jlist 35 will display a list of devices that can be added to the step in the Jtree 36. For example, if "Device 2", which is labeled with numeral 46, is selected, a list of devices that can be added to Step 1 will be displayed in the Jlist 35. A device can be added by using the "ADD" button 38 in the aforementioned manner. Devices can be deleted from a step by highlighting the device to be removed and by using the "REMOVE" button in the aforementioned manner. For example, removing Device 2 will cause that device and the commands 47 and 48, which belong to it, to be removed from the Jtree 36.

If a device node is selected by, for example, clicking the left mouse button once, a valid set of commands that can be used with the device will be listed in the Jlist 35. Commands can then be added to the Jtree 36 by using the "ADD" button 38 in the aforementioned manner. Commands can be removed from the Jtree 36 by using the "REMOVE" button in the aforementioned manner.

Figure 3:
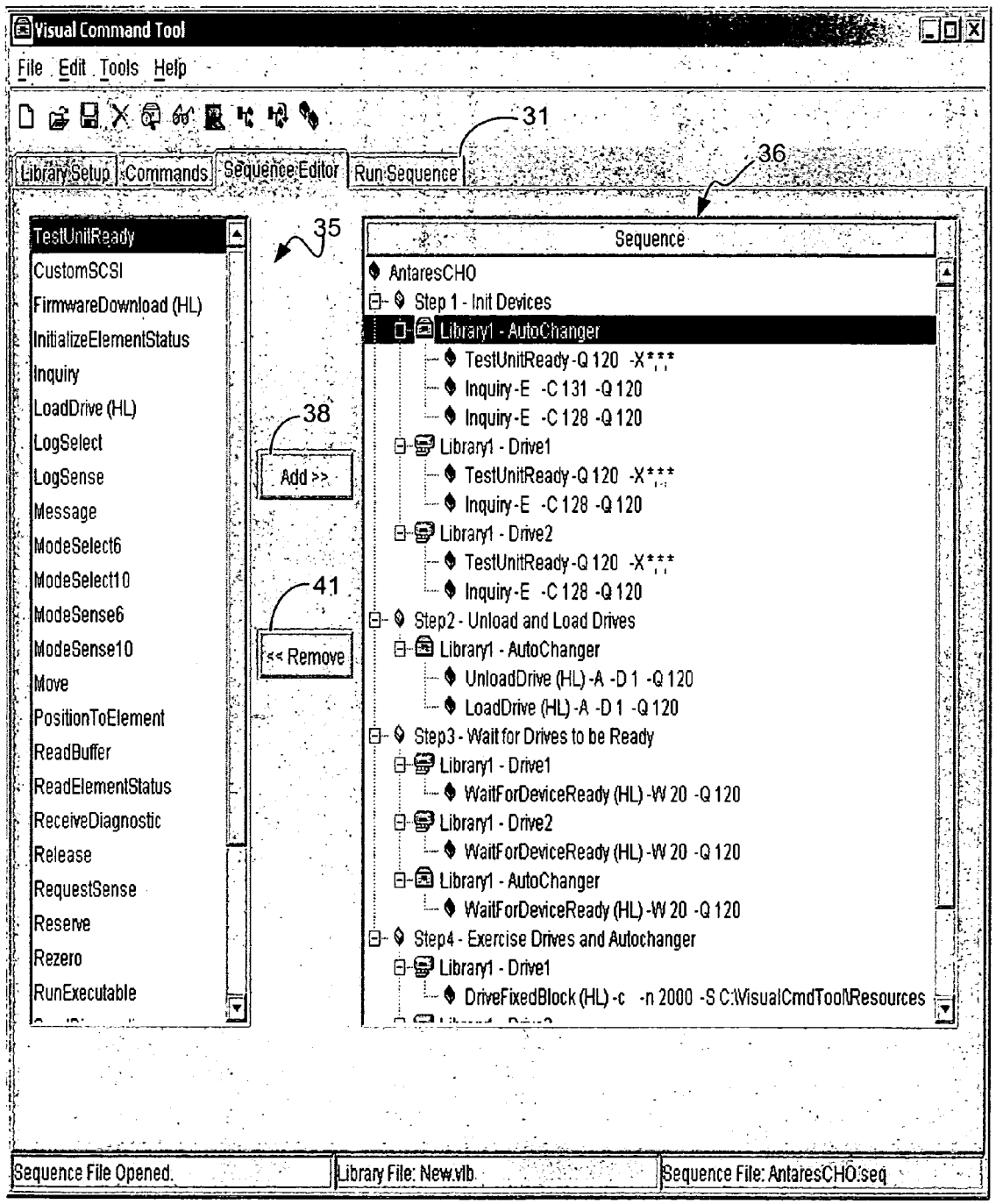
FIG. 3 is a screen shot illustrating an exemplary implementation of the GUI design of FIG. 2.

FIG. 3 is a screen shot illustrating an exemplary implementation of the tree-based GUI shown in FIG. 2. The device node labeled "Library 1—AutoChanger" has been selected in the Jtree 36, thereby causing a valid list of commands for this device to be displayed in the Jlist 35. Step 1 in FIG. 3 is an initialization step that initializes all of the devices belonging to the steps, namely, an AutoChanger and tape drives 1 and 2. The other steps correspond to various operations performed by the AutoChanger in conjunction with the drives, such as loading and unloading particular tapes onto and from the drives. It can be seen that the names of the machine control sequence, the devices and the commands are easily understandable, which facilitates creating and editing the machine control sequences.

Figure 4:
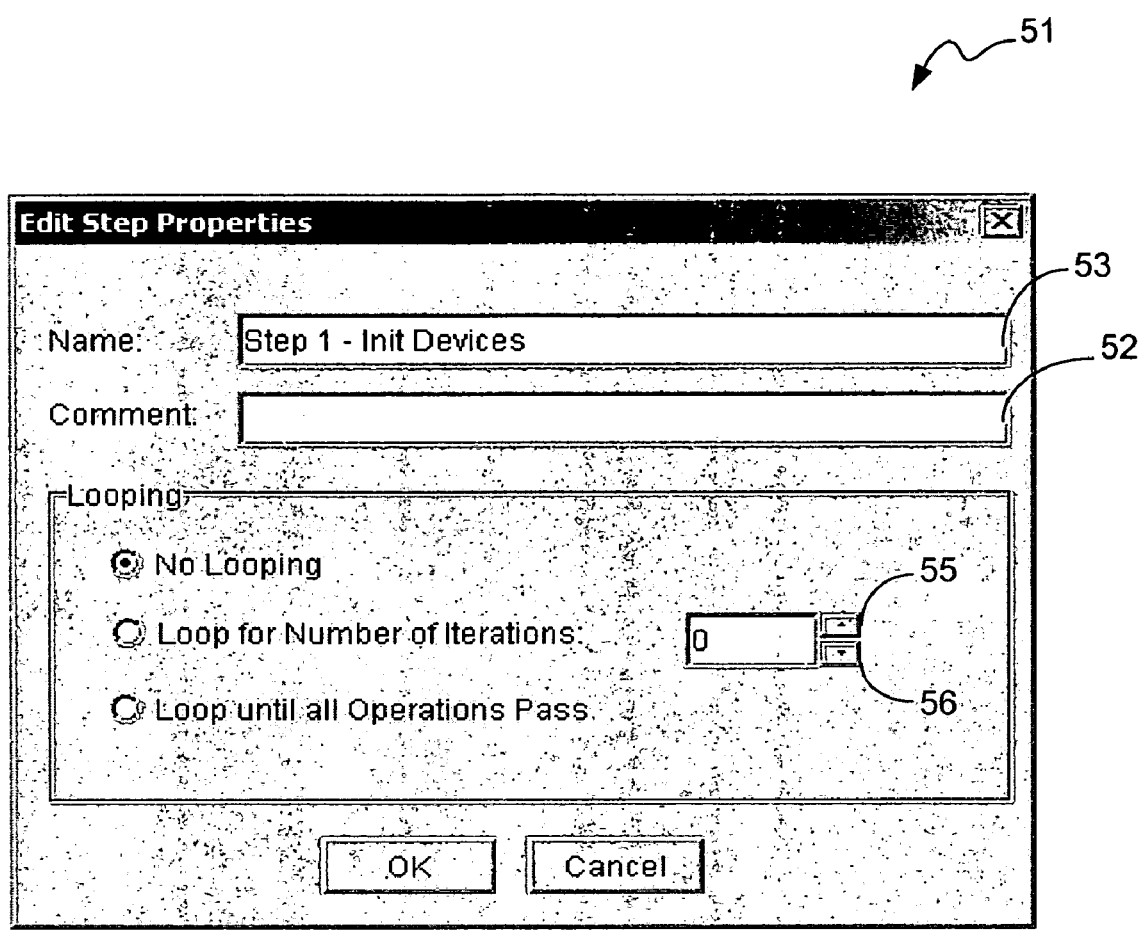
FIG. 4 is an example of a window presented to the user when a step node of the GUI shown in FIG. 3 is selected by the user.

Further explanations of the machine control sequences, the devices and the commands can be obtained by first clicking with the left mouse button on one of the structures in the Jtree 36 to cause it to be highlighted and then clicking the right mouse button. These actions will cause a window to be displayed to the user that further describes the selected tree structure. For example, if applied to a step node, these actions would cause the screen 51 shown in FIG. 4 to be displayed to the user. The screen displays a name comment box 52 that the user can use to type comments in that describe the step in detail. A name box 53 contains the name of the step. This window can also be used to further edit what a step does, i.e., to change the step without changing the device(s) or their command(s). For example, the user can select "Loop for Number of Iterations" to cause the step to loop for a number of iterations. The number of iterations is selected by clicking on the up or down buttons 55 and 56.

Alternatively, the option "Loop until all Iterations Pass" could be selected to cause the step to be iterated until all operations associated with it pass, i.e., have been successfully performed. Another option is to select "No Looping" so that the step is only performed once. Thus, levels of logic can be easily added without the user having to deal with lots of statements and parameters. Once the step properties have been set, the user clicks the "OK" button, which will cause the screen shown in FIG. 3 to once again be displayed.

Figure 5:
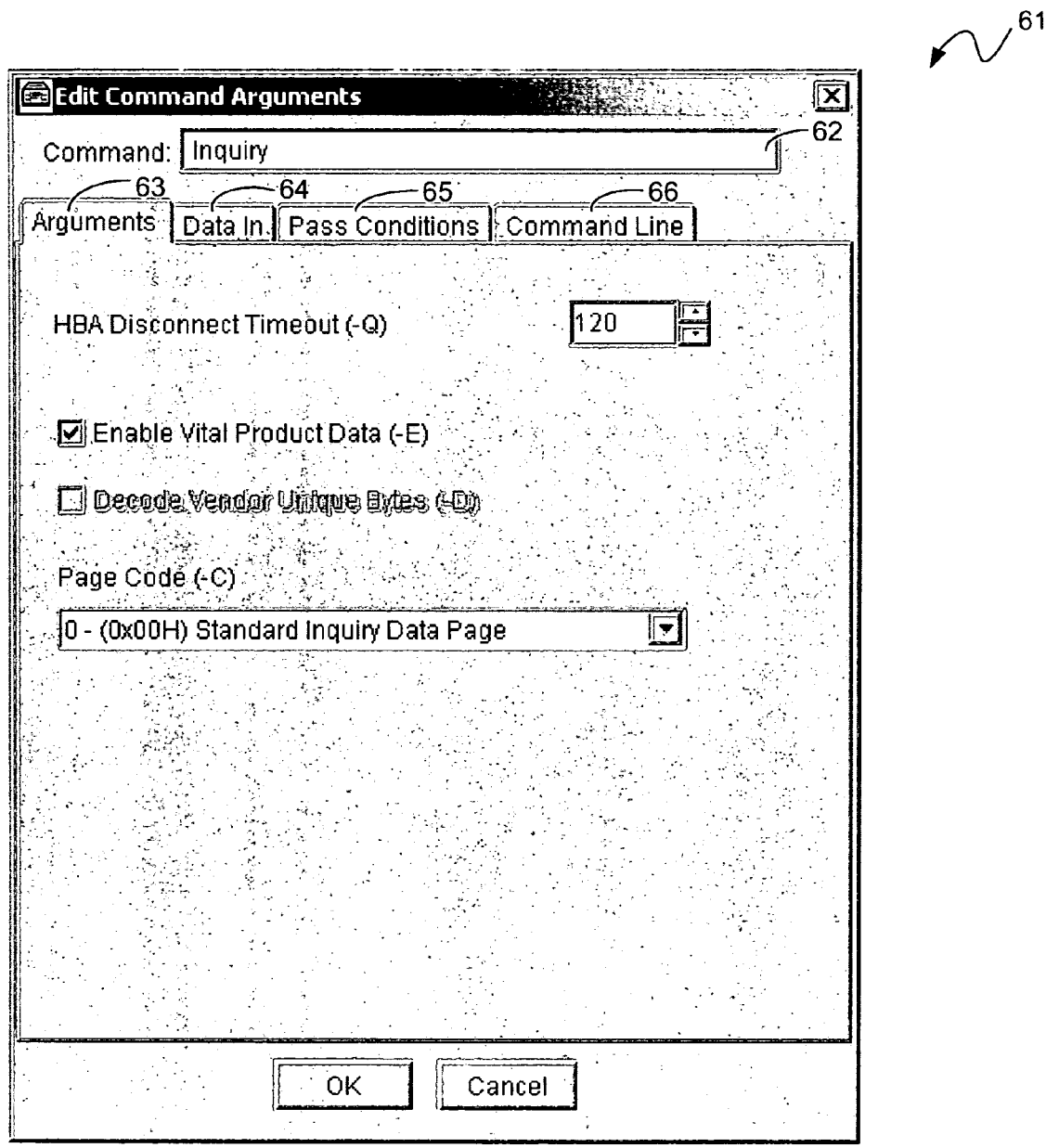
FIG. 5 is an example of a window presented to the user when a command node of the GUI shown in FIG. 3 is selected by the user.

FIG. 5 illustrates an example of a window 61 that is displayed when the user highlights one of the commands in the Jtree 36 and then right-clicks the mouse. The name of the command is shown in the box 62. The content of this screen will vary depending on the command because different commands require different parameters. For example, some commands, such as a write command, take data out, whereas some commands, such as the inquiry command shown, take data in. Therefore, the window depicted has a "Data In" tab 64, which, if selected, will cause options to be displayed to the user indicating the types of data that can be selected for utilization in executing the command. The "Pass Conditions" tab 65, if selected by the user, will cause options to be displayed that indicate the types of conditions that must be met for successful command execution. The "Command Line" tab 66, if selected, provides the user with the ability to directly edit the command line. The window 63 is the arguments screen, which enables the user to configure the arguments associated with the command.

Figure 6:
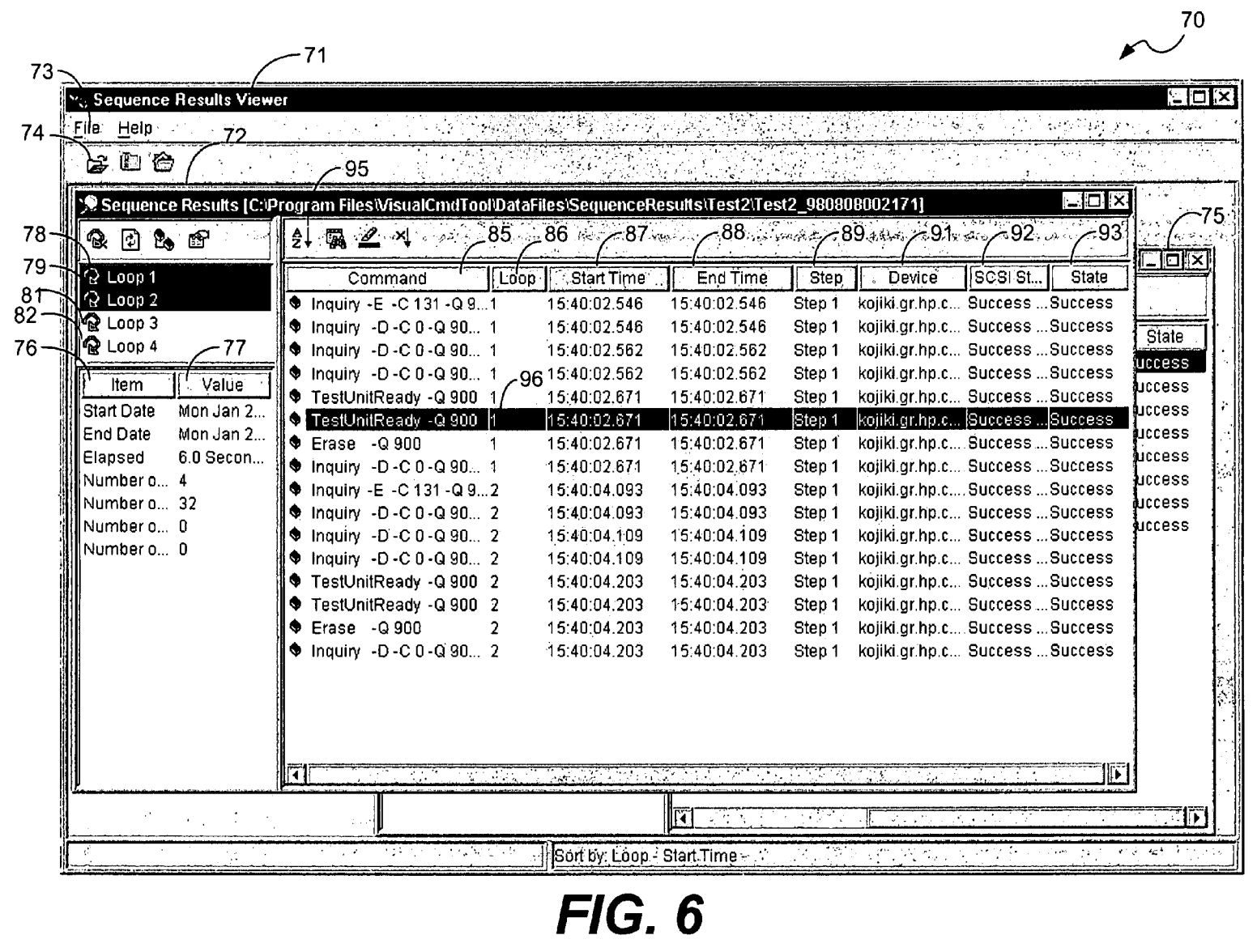

Having discussed the manner in which machine control sequences can be created and edited, the manner in which the GUI of the present invention enables convenient and expedient analysis of machine control sequences and their corresponding execution results will now be discussed with reference to FIG. 6. This figure illustrates a screen shot 70 of two example windows 71 and 72 that are displayed in the GUI to enable the user to analyze machine control sequences and their execution results. The window 71 is a "Sequence Results Viewer" window, which is the initial window displayed to the user when the user interacts with the GUI to cause sequence results to be displayed.

A particular machine control sequence is executed when the user selects the "Run Sequence" tab 31 shown in FIG. 3 and then selects the machine control sequence to be executed. When the user selects the "Run Sequence" tab 31, a list of machine control sequence names will be displayed in a window to the user. The user then simply selects the machine control sequence to be executed. When a machine control sequence is executed, the results are automatically stored as files in memory. The user is able to open a results file by clicking on the "file" menu item 73 or the open icon 74. When the user opens a results file, the "Sequence Results" window 72 appears, which displays a wealth of information to the user in a format that is easy to understand. The drive path where the results are stored is displayed at the top of the window 72.

The "Sequence Results Viewer" 71 portion of the GUI is a multiple document interface (MDI), which means that it allows multiple sets of results, i.e., multiple files, to be simultaneously displayed in different "Sequence Results" windows. For purposes of illustration, a clipped portion of a "Sequence Results" window 75 is shown behind "Sequence Results" window 72. Therefore, results of executions of multiple sequences can be displayed simultaneously to the user. The results displayed in these windows 72 and 75 can correspond to the same iterations for the same sequence, different iterations for the same sequence, or they can each display results of iterations of different sequences. Also, although the example window shown in FIG. 6 illustrates the "Sequence Results Viewer" window 71 as being behind and partially occluded by the "Sequence Results" window 72, these windows 71 and 72 may also either be displayed as separate windows or as active portions of a different window (not shown) so that they are simultaneously and fully viewable by the user. Similarly, although the example window shown in FIG. 6 illustrates the "Sequence Results" window 75 being behind and partially occluded by the "Sequence Results" window 72, these windows may also either be displayed as separate windows or as active portions of a different window so that they are simultaneously and fully viewable by the user.

Once the "Sequence Results" window 72 has been opened, an item 76 and value 77 pair are displayed. Underneath this pair, a number of statistics are displayed that provide the user with a high-level summary of the execution results of the sequence for the entire sequence run, i.e., from the start of the first loop of the sequence run to the end of the last loop of the sequence run. The term "loop" denotes an iteration of the entire sequence. For example, the example summary includes the start date of the sequence run, the end date of the sequence run, the amount of time that elapsed during the sequence run, the number of loops of the sequence that were performed during the sequence run, the total number of commands that were executed during the run, the number of failed commands during the sequence run, and the number of (small computer system interface) SCSI check conditions that occurred during the sequence run.

The "Sequence Results" window 72 also displays loop icons. These loop icons are represented by numerals 78, 79, 81 and 82 in FIG. 6. Only four loop icons are shown in this example, which indicates that, for the entire example sequence run, four iterations of the example sequence were executed. It will be appreciated that the number of iterations shown in this example is for purposes of illustration only and that a sequence can be iterated only once or as many times as desired or needed. Preferably, a loop icon, such as one of the loop icons 78, 79, 81 and 82, will be displayed in the window 72 for each iteration performed. When the user highlights one of the loops 78, 79, 81 and/or 82, the right side of the window 72 displays low-level detailed information relating to execution of each command of the sequence for each of the highlighted loop(s). In this example, loops 79 and 81 are shown as being highlighted. The window contains a command label 85, a loop label 86, a start time label 87, an end time label 88, a step label 89, a device label, 91, a SCSI status label 92 and an overall success/failure label 93. Since only loops 78 and 79 are highlighted in this example, information relating only to loops 1 and 2 is shown under the loop label 86. The names of each command executed during each loop is provided under the command label 85. The device that executed the command is provided under the device label 91 in the same line as the command. The step to which the device and command belong is listed under the step label 89 in the same line with the corresponding device and command.

The times at which each command began and ended being executed are also shown under the start and end time labels 87 and 88, respectively, in the same line as the corresponding command. Also, whether the command succeeded or failed is indicated under labels 92 and 93 in the line in which the corresponding command is shown.

Therefore, ample low-level information is displayed in the window 72 to enable the user to easily and expediently perform an in-depth analysis of the results of the sequence run and to perform any necessary debugging relating to the sequence run. In addition, the window 72 includes an icon 95 that can be selected by the user to cause the low-level results to be sorted and displayed in a particular order. For example, the user can cause the data to be sorted and displayed such that all of the data corresponding to failures is displayed at the top of the window 72. As another example, the user may want to cause the data to be sorted to group all like commands to see if any of those failed. These are only examples of the sorting feature of the GUI. Sorting techniques are generally well known. Therefore, those skilled in the art will understand, in view of the discussion provided herein, the manner in which a large number of useful sorting methods can be employed to enable the user to view the low-level data in a desirable format. Generally, selecting icon 95 causes a large dialog of sorting options to be displayed to the user from which the user can select the appropriate sorting method.

The "Sequence Results" window 72 also provides the user with the ability of digging down into further low-level detail by selecting a particular command from the list of commands displayed under the command label 85. For example, the user double clicks on the highlighted command 96, another window will be displayed to the user, thereby providing the user with additional information relating to that particular command and its execution results. Therefore, the user can dig down virtually as far as is necessary or desirable to view data relating to the sequence run for purposes such as debugging, for example, such as the raw SCSI data that was sent to the device, a parsed representation of SCSI data indicating specific device details regarding which device the SCSI data was sent to or from, etc. In the interest of brevity, a detailed discussion of all of the different types of information that are accessible to the user via the GUI and the different viewing formats that the user may be provided with via the GUI will not be provided herein.

It can be seen from all of the above that the present invention enables the results of machine control sequence runs to be easily and quickly analyzed. Furthermore, the present invention enables the sequence run results to be displayed to the user with as much or as little detail as the user desires. Furthermore, by implementing the code associated with the GUI and the sequences in the JAVA™ programming language, the present invention is usable with many different types of machines and operating systems. The GUI system of the present invention eliminates problems associated with current analysis techniques that require that text-based scripts and log files be analyzed in order to evaluate the corresponding machine control sequences and their execution results.

It should be noted that the present invention has been described with reference to the preferred embodiments, but that it is not limited to these embodiments. For example, the screen shots discussed herein demonstrate the manner in which the GUI of the present invention can be and preferably is implemented, but do not represent the only way for implementing the GUI. Those skilled in the art will understand that the windows shown and the options displayed in them can be modified without deviating from the scope of the invention. For example, the arrangements and/or of the icons, labels, menus, names, etc., can be altered without deviating from the scope of the invention. Persons skilled in the art will understand that the scope of the present invention includes all such modifications.

What is claimed is:

1. An apparatus for providing a graphical user interface (GUI) comprising:
   logic configured to execute GUI generation code and GUI user interaction handling code; and
   a display device in communication with said logic, wherein execution of the GUI generation code by said logic causes a first window and a second window to be displayed on the display device, said first window presenting a first panel configured to present plural devices and associated commands of a sequence as a hierarchical tree structure, each of the devices in the sequence being at a different hierarchical level than a hierarchical level of one or more commands associated with the device, the first window presenting a second panel configured to present one or more available commands and devices for adding commands and devices to the sequence, and said second window presenting results of execution of the sequence,
   wherein said presented results include information defining an iteration associated with a displayed command.

2. The apparatus of claim 1, wherein said first and second panels are simultaneously and fully viewable by a user.

3. The apparatus of claim 1, wherein each of the commands comprises an argument.

4. An apparatus for providing a graphical user interface (GUI) comprising;
   logic configured to execute GUI generation code and GUI user interaction handling code; and
   a display device in communication with said logic, wherein execution of the GUI generation code by said logic causes a first window and a second window to be displayed on the display device, said first window presenting a first panel configured to represent plural devices and associated commands of a sequence as hierarchical tree structure, each of the devices in the sequence being at a different hierarchical level than a hierarchical level of one or more commands associated with the device, the first window presenting a second panel configured to present one or more available commands and devices for adding commands and devices to the sequence, and said second window presenting results of execution of the sequence,
   wherein said presented results include a start time and an end time associated with execution of each command.

5. The apparatus of claim 1, wherein said presented results include a step associated with a displayed command.

6. The apparatus of claim 1, wherein said presented results include a device associated with a displayed command.

7. The apparatus of claim 1, wherein said presented results include information indicating whether or not a displayed command was successfully executed.

8. An apparatus for providing a graphical user interface (GUI) comprising:
   logic configured to execute GUI generation code and GUI user interaction handling code; and
   a display device in communication with said logic, wherein execution of the GUI generation code by said logic causes a first window and a second window to be displayed on the display device, said first window presenting a first panel configured to present plural devices and associated commands of a sequence as a hierarchical tree structure, each of the devices in the sequence being at a different hierarchical level than a hierarchical level of one or more commands associated with the device, the first window presenting a second panel configured to present one or more available commands and devices for adding commands and devices to the sequence, and said second window presenting results of execution of the sequence,
   wherein said second window displays a unique iteration number identifier for each of one or more iterations of the sequence, each of said iteration number identifiers uniquely identifying a particular iteration of said sequence, and wherein when a user selects one of said unique iteration number identifiers, information describing each command executed during the iteration associated with the selected iteration number identifier is displayed on said display device.

9. The apparatus of claim 8, wherein said information comprises:
   a start time and an end time associated with execution of each command that was executed during the iteration associated with the selected iteration number identifier;
   information identifying the iteration associated with each command;
   a step associated with each command;
   a device associated with each command; and
   information indicating whether each command was successfully executed.

10. The apparatus of claim 1, wherein the GUI generation code and the GUI user interaction handling code are written in an object-oriented, platform-independent language.

11. A method for enabling a user to analyze results of execution of a sequence, the sequence including devices and associated commands, the method comprising:

presenting a first option that enables a user to open a first window;

displaying the first window responsive to selection of the first option, the first window containing a first portion displaying the sequence and a second portion displaying a set of one or more available commands for inserting into the displayed sequence;

presenting a second option that enables execution of the sequence; and displaying, in a second window, results of execution of the sequence in response to selection of the second option, the results displayed containing the commands in the sequence and information identifying devices associated with the commands, wherein displaying the results of the execution further comprises displaying information identifying an iteration of the sequence associated with a displayed cormnand.

12. The method of claim 11, wherein said first and second portions are capable of being simultaneously and fully viewable by a user.

13. A method for enabling a user to analyze results of execution of a sequence, the sequence including devices and associated commands, the method comprising:

presenting a first option that enables a user to open a first window;

displaying the first window responsive to selection of the first option, the first window containing a first portion displaying the sequence and a second portion displaying a set of one or more available commands for inserting into the displayed sequence;

presenting a second option that enables execution of the sequence; and displaying, in a second window, results of execution of the sequence in response to selection of the second option, the results displayed containing the commands in the sequence and information identifying devices associated with the commands, wherein displaying the results of the execution comprises displaying a start time and an end time associated with execution of each command of the sequence.

14. The method of claim 11, wherein displaying the results of the execution comprises displaying information identifying each step associated with a displayed command.

15. The method of claim 13, wherein displaying the results of the execution comprises displaying information indicating whether a displayed command was successfully executed.

16. An apparatus, comprising:

a processor configured to execute logic configured to generate a graphical user interface (GUI), logic configured to interact with at least one human to machine interface, and logic configured to generate commands applied to control systems within one or more remote devices; and a display device in communication with said processor, wherein when said processor executes the logic configured to generate the GUI, a first window is displayed on the display device that displays both a sequence in a first portion of the first window and a list of one or more commands in a second portion of the first window, the displayed sequence being in a hierarchical tree structure in which plural devices and associated commands of the displayed sequence are at different hierarchical levels, wherein said first window presents a first option, the selection of which executes the sequence, wherein when a second option is selected, the display device displays a second window displaying results of execution of plural iterations of the sequence.

17. The apparatus of claim 16, wherein the one or more remote devices comprise devices configured to house and manipulate data storage media.

18. The apparatus of claim 1, wherein execution of the sequence causes communication with the devices identified by the sequence.

19. The apparatus of claim 1, further comprising a memory to store a file containing the results of the execution of the sequence, wherein the second window presents the results of the execution of the sequence in response to selection of a displayed option that enables opening of the file.

20. An apparatus for providing a graphical user interface (GUI) comprising:

logic configured to execute GUI generation code and GUI user interaction handling code; and a display device in communication with said logic, wherein execution of the GUI generation code by said logic causes a first window and a second window to be displayed on the display device, said first window presenting a first panel configured to present plural devices and associated commands of a sequence as a hierarchical tree structure, each of the devices in the sequence being at a different hierarchical level than a hierarchical level of one or more commands associated with the device, the first window presenting a second panel configured to present one or more available commands and devices for adding commands and devices to the sequence, and said second window presenting results of execution of the sequence, wherein the execution of the sequence causes testing of the devices identified in the sequence.

21. The method of claim 11, further comprising:

storing the results of execution of the sequence in a file; and in response to receiving user activation of a displayed option, open the file to enable displaying the results in the second window.

22. A computer-readable medium storing a computer program for generating a graphical user interface (GUI), the program when executed causing a computer to:

display a sequence of steps on a display device, the steps including respective devices and commands;

display, on the display device, at least one of a list of available devices and a list of available commands that are insertable into the sequence for editing the sequence in response to selection of a first option that is displayed on the display divice;

activate execution of the sequence in response to selection of a second option that is displayed on the display device; and display results of the execution of the sequence in a first window on the display device, wherein the displayed results contain results for plural iterations of the sequence.

23. The computer-readable medium of claim 22, wherein the program when executed causes the computer to display the sequence of steps and the at least one of the list of available devices and list of available commands in a second window.

24. The computer-readable medium of claim 22, wherein the program when executed causes the computer to remove at least one of a step, device, and command from the sequence in response to selection of a third option displayed on the display device.

25. The computer-readable medium of claim 22, wherein execution of the sequence causes testing of one or more devices identified in the sequence.

26. A computer-readable medium storing a computer program for generating a graphical user interface (GUI), the program when executed causing a computer to:
   display a sequence of steps on a display device, the steps including respective devices and commands;
   display, on the display device, at least one of a list of available devices and a list of available commands that are insertable into the sequence for editing the sequence in response to selection of a first option that is displayed on the display device;
   activate execution of the sequence in response to selection of a second option that is displayed on the display device; and
   display results of the execution of the sequence in a first window on the display device,
   wherein the displayed results contain a start time and an end time associated with execution of each command in the sequence.

27. The computer-readable medium of claim 22, wherein the displayed results contain information associated with one or more remote devices tested by the execution of the sequence.

28. The apparatus of claim 1, wherein the first panel is configured to further present at least a step of the sequence, the step including at least one of the devices and the one or more commands associated with the at least one device, wherein the step is at a hierarchical level that is different from the at least one device.

29. The method of claim 11, wherein displaying the sequence comprises displaying the sequence as a hierarchical tree structure, each of the devices in the sequence being at a different hierarchical level of the hierarchical tree structure than a hierarchical level of one or more commands associated with the device.

30. The method of claim 11, wherein the sequence further comprises at least one step that includes at least one device and one or more commands associated with the at least one device, and wherein displaying the sequence comprises displaying the sequence as a hierarchical tree structure, the at least one step, the at least one device, and the associated one or more commands being at different hierarchical levels in the tree structure.

31. The computer-readable medium of claim 22, wherein the sequence is displayed as a hierarchical tree structure containing the steps, devices, and commands, each step at a hierarchical level different from the respective hierarchical levels of the devices and commands included in the corresponding step.

* * * * *

UNITED STATES PATENT AND TRADEMARK OFFICE
CERTIFICATE OF CORRECTION

| | |
|---|---|
| PATENT NO. | : 7,367,017 B2 |
| APPLICATION NO. | : 09/773118 |
| DATED | : April 29, 2008 |
| INVENTOR(S) | : Peter M. Maddocks et al. |

It is certified that error appears in the above-identified patent and that said Letters Patent is hereby corrected as shown below:

In column 8, line 9, in Claim 4, delete "represent" and insert -- present --, therefor.

In column 8, line 10, in Claim 4, after "as" insert -- a --.

In column 9, lines 23-24, in Claim 11, delete "cormnand" and insert -- command --, therefor.

In column 10, line 60, in Claim 22, delete "divice" and insert -- device --, therefor.

Signed and Sealed this

Fifth Day of August, 2008

JON W. DUDAS
*Director of the United States Patent and Trademark Office*